United States Patent [19]

Takai et al.

[11] Patent Number: 5,031,475
[45] Date of Patent: Jul. 16, 1991

[54] POWER MECHANISM

[75] Inventors: Kazuki Takai; Takahiro Asano; Wataru Watanabe, all of Tokyo, Japan

[73] Assignee: Clarion Co., Ltd., Tokyo, Japan

[21] Appl. No.: 470,852

[22] Filed: Jan. 26, 1990

[30] Foreign Application Priority Data

Feb. 1, 1989 [JP] Japan ............................ 1-20825

[51] Int. Cl.⁵ ............................................ G05G 11/00
[52] U.S. Cl. .................................. 74/483 R; 360/137
[58] Field of Search ........ 360/137; 74/483 R, 483 PB

[56] References Cited

U.S. PATENT DOCUMENTS

| 4,330,801 | 5/1982 | Morinaga et al. | 360/137 X |
| 4,408,237 | 10/1983 | Takahashi et al. | 360/137 X |
| 4,420,783 | 12/1983 | Suezawa et al. | 360/137 |
| 4,495,535 | 1/1985 | Kohri et al. | 360/137 X |

FOREIGN PATENT DOCUMENTS 62-139159  6/1987  Japan ................................ 360/137

Primary Examiner—Leslie A. Braun
Assistant Examiner—Scott Anchell
Attorney, Agent, or Firm—Flynn, Thiel, Boutell & Tanis

[57] ABSTRACT

A power mechanism used in a tape recorder for mode changes, etc. does not use a solenoid plunger, but uses a simple arrangement which includes a select plate having a swing portion which swings between a shift position for shifting an operated member and a release position for releasing the operated member when the select plate advances with a rotating force of a power cam and includes a guide mechanism for guiding the swing portion toward the shift and release positions.

1 Claim, 13 Drawing Sheets

POWER MECHANISM

FIELD OF THE INVENTION

This invention relates to an improvement of a power mechanism of a tape player.

BACKGROUND OF THE INVENTION

Tape players in general are operative in several different modes such as forward play, reverse play, fast-forwarding, rewinding, etc. In these modes, a related member or element is driven by a power mechanism to perform a shift operation and is held by a lock mechanism in the shift position.

When a tape player is changed from one mode to another, its lock mechanism must be released, and therefore the tape player must include means for releasing the lock mechanism. Conventional proposals for such purposes are the use of another power mechanism for releasing the lock mechanism or the use of an electromagnetic solenoid in most usual cases.

In such releasing means using a solenoid called "suction tape solenoid" powerful enough to bring an attracted member thereto from a distant position by its own attraction force, a mode member is shifted and held in its shift position upon energization of the solenoid and is released upon deenergization of the solenoid. A merit of the suction type solenoid is that the shift operation, locking in the shifted position and unlocking are effected by a single member.

The suction type solenoid, however, is large-scaled relative to the magnitude of its electromagnetic force and this has been an obstacle to progress scale reduction of a tape player. In this respect, there is another proposal of using a small-scaled solenoid called attraction type solenoid, which merely has an attracting force large enough to hold an attracted member brought thereto by another mechanism. That is, a shift operation with a large operation load is mechanically effected by a power mechanism, and the attraction type solenoid is used for locking the moved member in the moved position and unlocking it therefrom.

The conventional arrangements, however, involve the following problems.

Since the attraction type electromagnetic solenoid has a small electromagnetic force, independent shift means is required for reciprocating a mode member unlike the suction type solenoid, and this complicates the entire arrangement.

When using an electromagnetic solenoid as a power mechanism, a high cost of the electromagnetic solenoid itself, either of the suction type or the attraction type, increases the manufacturing cost of the type player.

OBJECT OF THE INVENTION

It is therefore an object of the invention to provide a power mechanism not using a solenoid plunger to reduce the manufacturing cost.

A further object of the invention is to provide a power mechanism which by itself alone is selectively operative to shift a mode member from its non-locked position and unlock the mode member from the locked position, thereby simplifying the mechanism and enabling scale reduction.

SUMMARY OF THE INVENTION

According to the invention, there is provided a power mechanism comprising:

an operated member disposed for reciprocating motion between a shift position and a retreat position;

a lock member for holding said operated member in said shift position;

biasing means for biasing said operated member toward said retreat position;

a power cam rotated by a driving force from a driving motor;

a select plate movable between its advance and retreat positions and having a swing portion which swings between a shift position for shifting said operated member and a release position for releasing the lock of said lock member against said operated member when said select plate advances due to a rotating force of said power cam; and a guide mechanism which guides said swing portion of said select plate toward said shift position when said operated member is in said retreat position and toward said release position when said operated member is in said shift position.

The inventive arrangement operates as follows.

When the operated member is located in its retreat position, upon an advance of the select plate, the guide mechanism draws the swing portion of the select plate towards the shift position, and the operated member is shifted by a pivotal force of the power cam transmitted to the operated member via the select plate. The operated member is then trapped in the shift position by the lock member.

On the other hand, when the operated member is located in the shift position, upon another advance of the select plate, the guide mechanism draws the swing portion of the select plate toward the release position and releases the lock member which has trapped the operated member heretofore. At the same time, the operated member moves to its retreat position under the energy of the biasing means which biases the operated member toward the retreat position.

According to the inventive arrangement, the single power mechanism performs the shift operation and the lock releasing operation, without using the electromagnetic solenoid or a plurality of power mechanisms which were used in the conventional arrangement, and the manufacturing cost is significantly reduced. Further, since the arrangement is simplified, scale reduction is easy, and the operability is improved by preventing an increase in the operation load attendant to the use of a suction type solenoid.

DETAILED DESCRIPTION

A tape player using an inventive power mechanism as a head shift mechanism is specifically explained, referring to the drawings.

A. SLOT-IN EJECTING SECTION

Figure 1:
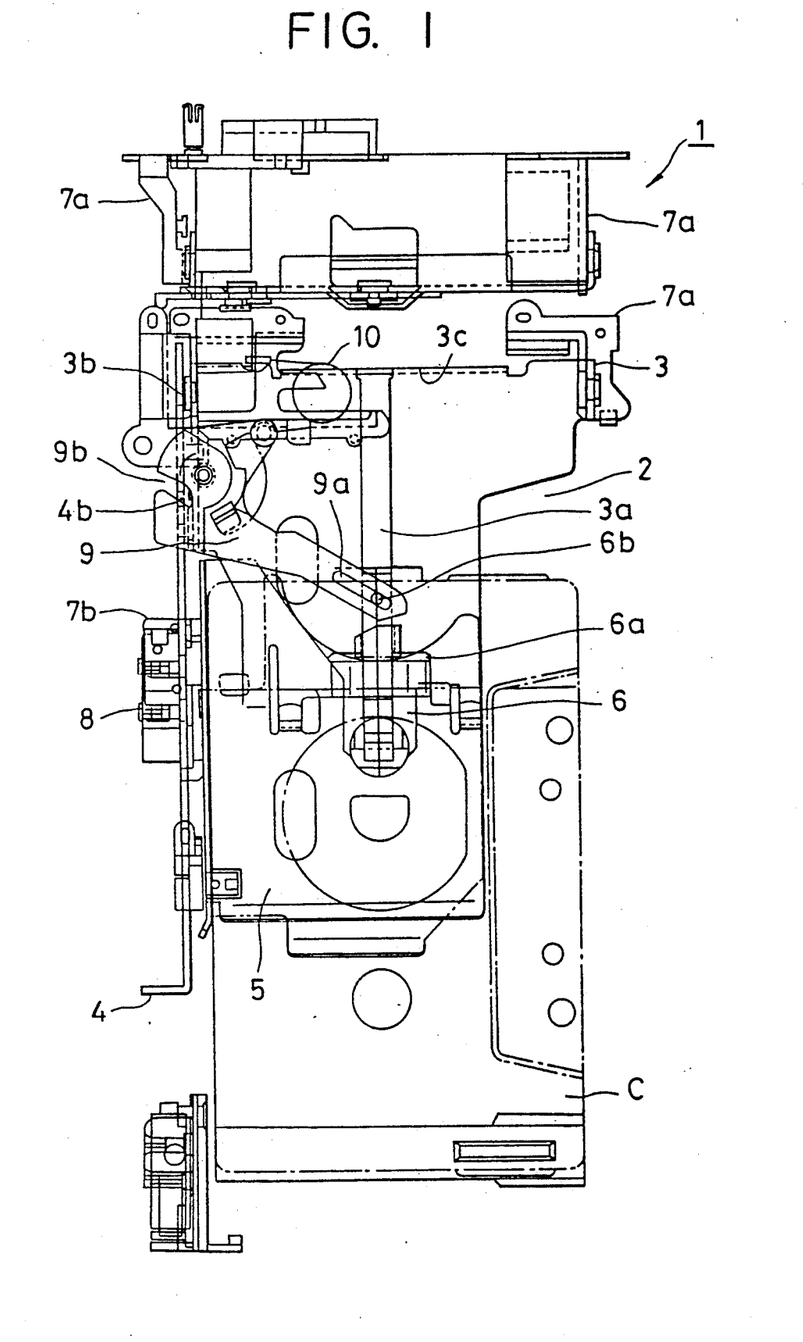
FIG. 1 is a plan view of an embodiment of the invention.

As shown in FIG. 1, a tape player 1 includes guide stands 7a and 7b which stand from opposite ends of a rear (upper in FIG. 1) portion of a deck plate and from the center of a left-side edge of the deck plate 2 and includes a guide arm 3 which is pivotably supported by the guide stands 7a at the rear opposite ends. Further, a reciprocal eject lever 4 is mounted on the rear, left-side guide stand 7a and a left side guide stand 7b, and a main switch 8 for a driving motor (not shown) is provided outside the guide stand 7b.

The guide arm 3 has a groove 3a in a central portion for accepting a slidable pack stopper 6 and has a round engage member 3b which projects outwardly from the left margin in the drawings. The guide arm 3 further has an abutting face 3c at the back thereof and a vertically (vertical of the drawing sheet surface) movable pack guide 5 at a rear end thereof. The pack guide 5 has in a front face thereof an aperture which permits longitudinal insertion of a cassette pack c and can move vertically in response to the guide arm 3. On the other hand, the pack stopper 6 has at a rear end thereof a stopper 6a which abuts the abutting face 3c of the guide arm 3, and has a projection 6b which projects upwardly from the upper face near the rear end thereof.

In a rear portion of the upper face of the guide arm 3 are provided a pivotable eject arm 9 and a slot-in spring 10. The eject arm 9 is V-shaped, and engages the slot-in spring 10 at one end and has an elongated hole 9a at the other end. The elongated hole 9a movably accepts the projection 6b of the pack stopper 6. Further, the eject arm 9 has a cutout 9b along the outer circumference of the root portion thereof, the root portion being the pivotally supported central portion at the apex of the "V". On the other hand, the slot-in spring 10 is so configured that when the eject arm 9 rotates in the counterclockwise direction, it moves toward the root portion of the eject arm 9 to rotate the eject arm 9 in the counterclockwise direction, and when the eject arm 9 rotates in the clockwise direction, it moves rear-wardly with respect to (upwardly in FIG. 1) to rotate the eject arm 9 in the clockwise direction.

Figure 2:
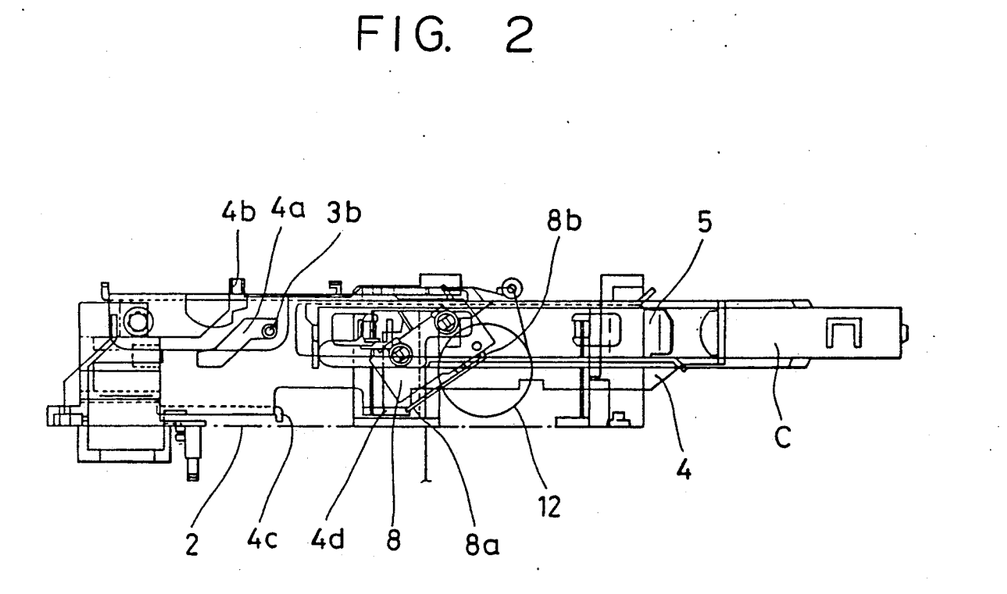
FIG. 2 is a side elevation of the same embodiment.

On the other hand, the eject lever 4, as shown in FIG. 2, has a slope 4a on a rear side surface, an upwardly standing projection 4b on a rear upper edge and a downwardly standing projection 4c on a rear lower edge. Among them, the slope 4a engages the engage member 3b of the guide arm 3, the projection 4b engages the cutout 9b of the eject arm 9, and the projection 4c abuts a memory plate 11 which will be referred to later. The eject lever 4 further includes an urging element 4d which extends to the exterior from a central lower edge and abuts the distal end of a switch urging element 8a of the main switch 8. The eject lever 4 is biased forwardly by an eject lever spring 12.

The main switch 8 is disposed in a slanted configuration outside the guide stand 7b, and has on the upper end of the lower face thereof a push button 8b and the switch urging element 8a for urging the pushbutton 8b. The switch urging element 8a is biased forwardly. The push button 8b is configured to activate the driving motor (not shown) when it is urged by the switch urging element 8a.

B. END DETECTION MECHANISM

Figure 3:
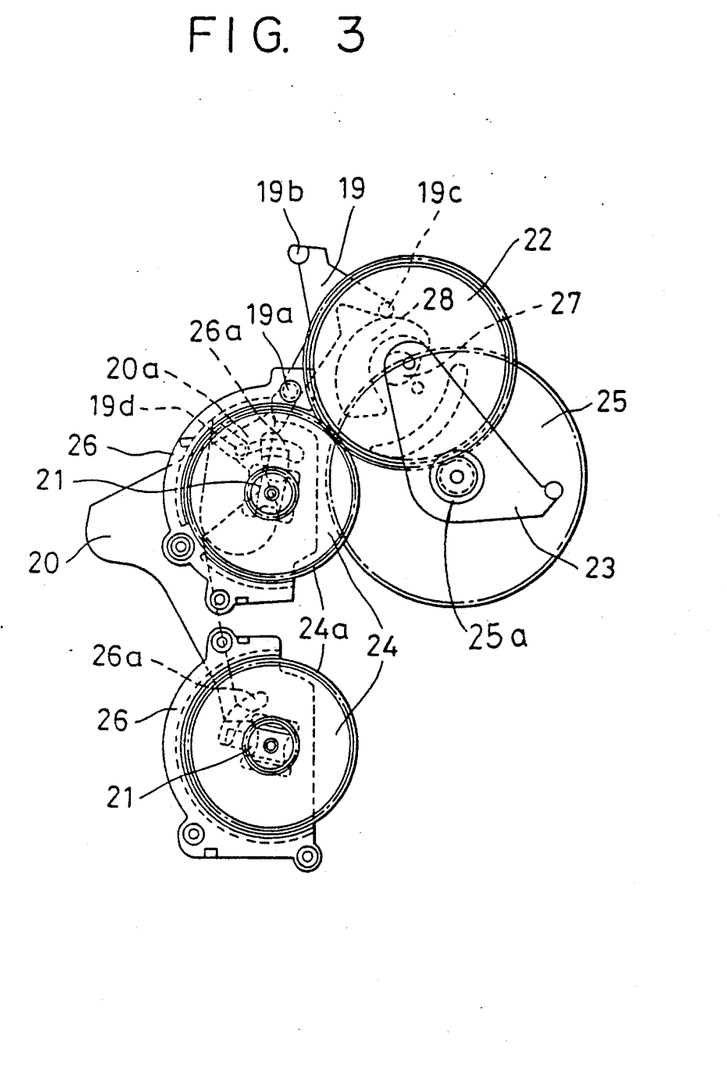
FIGS. 3 and 4 are fragmentary plan views of the same embodiment.

FIG. 3 is a plan view of members disposed along the lower face of the deck plate 2 for purposes of end detection.

A pair of pivotable reel bases 24 each having a check plate 21 at the center thereof are covered by reel holders 26 from the lower face. The check plate 21 projects downwardly and is swingingly accepted in an elongated hole 26a of the reel holder 26. A sensor arm 20 is pivotably supported on the reel holder 26 located in an upper position in the drawing so that its L-shaped end comes above the elongated hole 26a and the check plate 21 abuts it.

On the other hand, a flywheel 25 which receives the driving force from the driving motor (not shown) has a gear 25a at the center thereof, and the gear 25a engages an idler gear 22 (forward-drive). The idler gear 22 is mounted on a swinging idler arm 23 so that when the idler arm 23 (forward-drive) swings, it engages a gear 24a formed along the circumference of the reel base 24 to transmit the driving force of the driving motor (not shown) to the reel base 24. The idler gear 22 has an inner cam 27 and an outer cam 28 on the back face thereof.

Near the idler gear 22 is provided a power arm 19. The power arm 19 is pivotably supported on the deck plate 2 by a pivot 19a, and the upper right portion thereof with respect to the pivot 19a in the drawing has a bill-shaped projection. The lower left portion thereof with respect to the pivot 19a is oval approximately. The power arm 19 further includes a projection 19b and a projection 19c which project upwardly from the right upper end and from the distal end of the bill-shaped projection in the drawing. Among them, the projection 19b abuts a select plate 18 referred to later, and the projection 19c engages the inner cam 27 and the outer cam 28. Also on the oval root portion is formed a projection 19d which is accepted in an elongated hole 20a of the sensor arm 20 to establish a co-moving relationship between the power arm 19 and the sensor arm 20.

C. HEAD SHIFT MECHANISM

This embodiment includes the following members for effecting advancing and retreating movements (leftward and rightward movements in FIG. 5) of a head.

Figure 5:
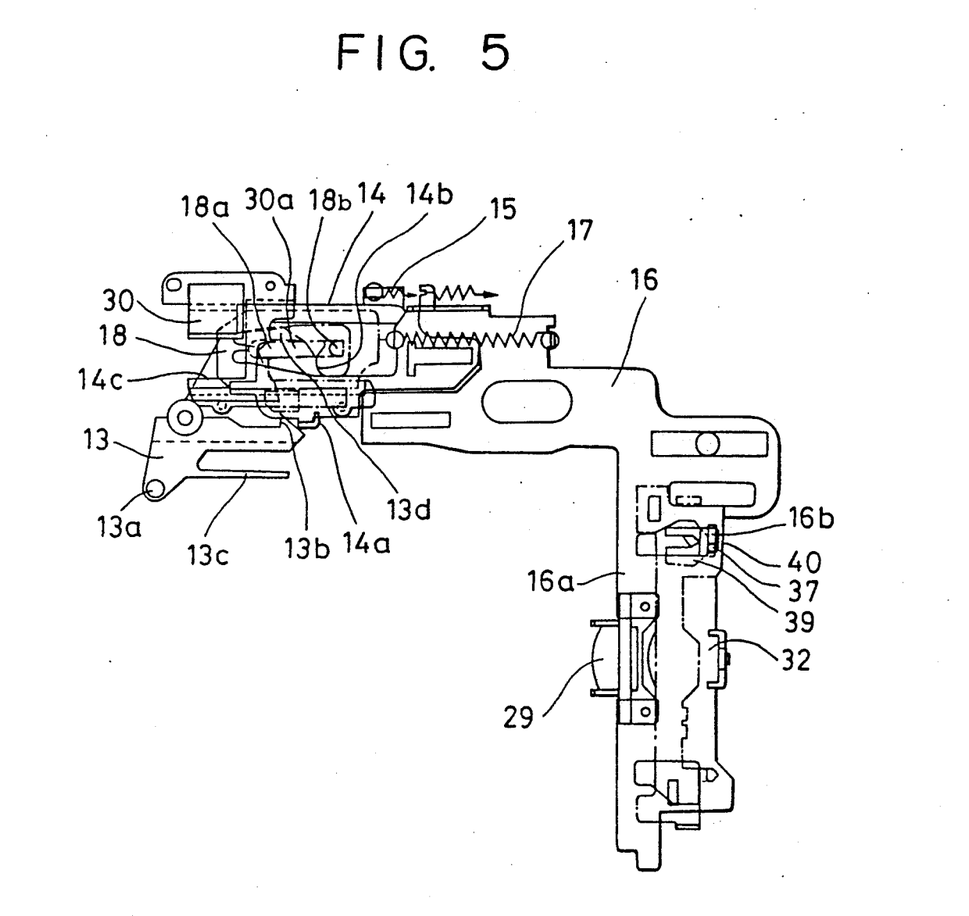
FIGS. 5 through 9 are plan views of the same embodiment.

As shown in FIG. 5, a power plate 14 and a head plate 16 are disposed for left and right movements in a rear portion of the surface of the deck plate 2. Both members are connected by a power plate spring 17 and are biased in the rightward direction by a head plate spring 15.

The power plate 14 has an engage portion 14a which projects downwardly from a portion near the left end thereof, a projection 14c at the left end and a guide portion 14b in a central opening. The guide portion 14b abuts a projection 18b of a select plate 18 referred to later and guide a swing portion 18a of the select plate 18 forwardly.

The head plate 16 is L-shaped and bears a head 29 in the center of its edge 16a which extends in parallel with the eject lever 4.

The select plate 18 movable in left and right directions and a pivotable lock arm 13 are disposed in an overlapping relationship on the back surface of the deck plate 2 corresponding to the position of the power plate 14. In a gap between the select plate 18 and the lock arm 13 is secured a power holder 30. The select plate 18, lock arm 13 and power holder 30 are made from resin.

The select plate 18 has a right end for abutting the projection 19b of the power arm 19 and has a swing portion 18a which is provided in the center of its opening and is capable of swinging. The swing portion 18a has a projection 18b which extends vertically (perpendicular to the plane of FIG. 5) from its distal (right) end. The power holder 30 is configured to abut the projection 18b and has a beveled guide claw 30a at its distal (right) end. The guide claw 30a is located in a left position of the guide portion 14b of the power plate 14, and has a rear (upper in FIGS. 5 to 9) edge and a front (lower in FIGS. 5 to 9) edge shorter than the rear edge so as to push the swing portion 18a rearwardly when the select plate 18 does not abut the power plate 14.

The lock arm 13 has a projection 13a at its left end and has an engage portion 13b at its right end for locking the engage portion 14a of the power plate 14. The lock arm 13 has a leaf spring 13c whose distal end (right end) abuts the reel holder 26 to transmit a counterclockwise rotating force to the lock arm 13. The lock arm 13 further includes a claw 13d at its rear end. The claw 13d is located in a rear position of the guide claw 30a of the power holder 30 so that the projection 18b of the select plate 18 pushed by the power holder 30 rearwardly abuts it to rotate the lock arm 13 in the clockwise direction.

D. CHANNEL CHANGE SECTION

In this embodiment, a channel change section for inverting the tape running direction and switching the idler gear and the pinch roller has the following arrangements.

Figure 9:
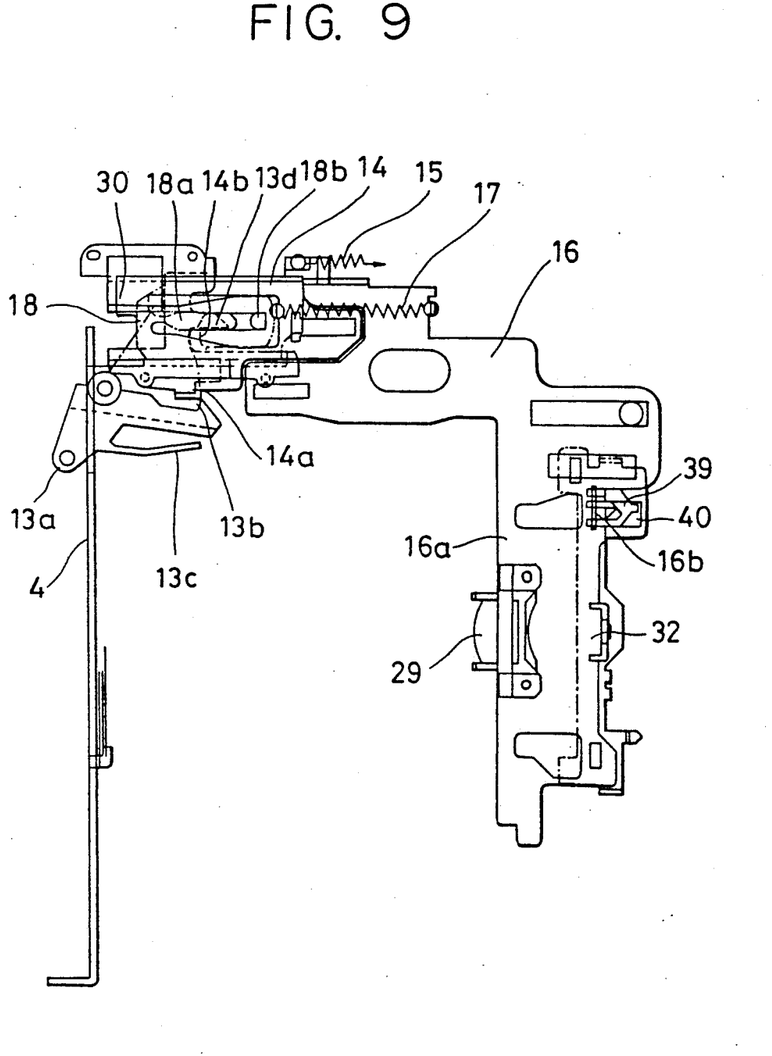
Figure 10:
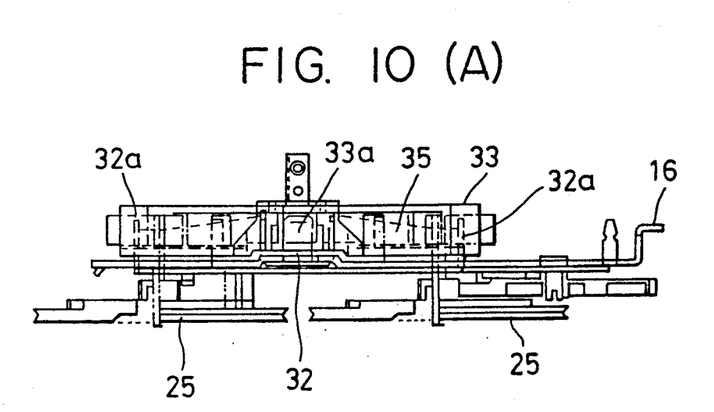
FIG. 10A is a side elevation of the same embodiment.

As shown in FIGS. 10A and 10B, between the edge 16a (see FIGS. 5 to 9) of the head plate 16 and the deck plate 2 is movably provided a change plate 32 which extends in parallel with the edge 16a. The change plate 32 has abutting portions 32a vertically standing from opposite ends thereof and has a change plate guide 39 in the form of a trifurcated opening near its rear end.

The change plate guide 39 has two guide slots 39a and 39b extending in parallel with the movement direction (right and left direction in FIG. 10B) of the head plate 16 and has a projection 39c projecting outwardly in its center. Further, a semicircular recess 39d is provided at a position outside the projection 39c.

Above the change plate 32 is provided a pinch roller case 33 attached to the head plate 16. The pinch roller case 33 is pivotably supported on the deck plate 2 by a pivot 33a and has pivotable pinch rollers 34 at opposite ends thereof. Near the opposite ends, the pinch roller case 33 engages the forward-drive and reverse-drive idler arms 23. The idler arm 23 bears the rotatable idler gear 22 at its distal end. The idler arm 23 swings when the change plate 32 moves. At this time, only one of the forward-drive and reverse-drive idler gears 22 engages the reel base 24 and the other is prevented by the change plate 32 from engaging the reel base 24. On the back face of the pinch roller case 33 is provided a pinch spring 35 which is so configured that when one end thereof abuts one of abutting portions 32a of the change plate 32, the other end of the pinch spring 35 urges the pinch roller case 33.

Figure 11:
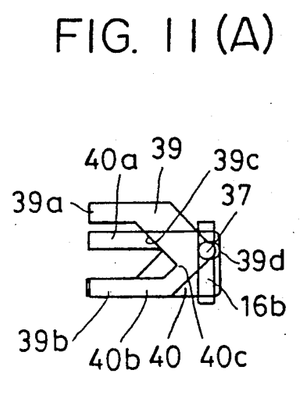
FIGS. 11A through 11G are fragmentary plan views of the same embodiment.

As shown in FIG. 11A which is an enlarged view of the dotted line portion of FIG. 9, an elongated hole 16b and a deck guide 40 are formed in the edge portion 16a of the head plate 16 and in the deck plate 2, respectively, in positions corresponding to the change plate guide 39.

The elongated hole 16b extends in parallel with the edge 16a and is slightly longer than the width of the deck guide 40. The deck guide 40 is in the form of a channel having two parallel guide slots 40a and 40b and has a projection 40c in the center thereof. One end of a slope edge of the projection 40c coincides with the apex of the projection 39c of the change plate guide 39.

The elongated hole 16b movably accepts a round pin 37 which extends through the change plate guide 39 and the deck guide 40, slidably engages the projection 39c of the change plate guide 39 and the projection 40c of the deck guide 40 and enters in the recess 39d of the change plate guide 39. Further, the pin 37, when slidably engages the projection 39c of the change plate guide 39, urges the change plate 32 so as to coincide the guide slot 39a of the change plate guide 39 with the guide slot 40a of the deck guide 40 and alternatively coincide the guide slot 39b of the change plate guide 39 with the guide slot 40b of the deck guide 40.

F. MEMORY START MECHANISM

In the arrangement utilizing advance and withdrawal movements of the head plate 16 to effect a channel change, the tape running direction is inverted upon a re-starting after ejection because the change plate 32 moves along the change plate guide 39. Therefore, this embodiment particularly uses a memory start mechanism, referred to below, for purposes of preventing inversion of the tape running direction.

Figure 12:
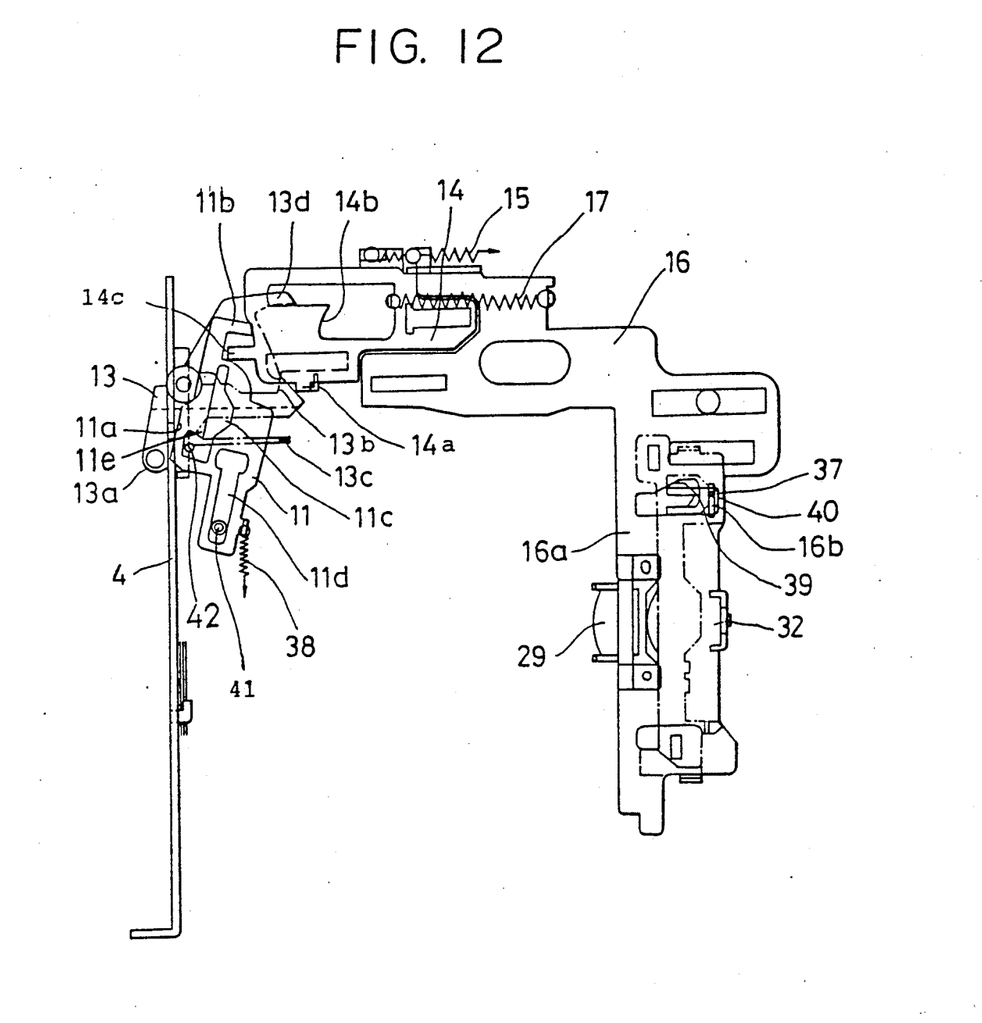
FIG. 12 is a plan view of the same embodiment.

As shown in FIG. 12, a memory plate 11 is mounted near the rear end of the eject lever 4 for reciprocal movements in the same direction as the eject lever 4 so as to move rearwardly when urged by the eject lever 4. The memory plate 11 has an urging portion 11a along an outer (left) side edge thereof for abutting the projection 13a of the lock arm 13 and has an engage claw 11b at the rear end thereof for engaging the projection 14c of the power plate 14. The memory plate 11 further includes an elongated slot 11c at the center thereof and an elongated slot 11d at the front end thereof. In the elongated slot 11c is provided a recessed hook 11e which accepts a deck pin 42 secured to the deck plate 2. On the other hand, the T-shaped elongated slot 11d accepts a guide pin 41, and a memory plate spring 38 is provided along the inner (right) side edge of the elongated slot 11d to bias the memory plate 11 forwardly.

The above-described embodiment operates as explained below.

A. SLOT-IN

As the cassette pack c is progressively inserted into the pack guide 5, the cassette pack c abuts the stopper 6a of the pack stopper 6, and further moves rearwardly together with the pack stopper 6 along the slot 3a of the guide arm 3. In response to the movement of the pack stopper 6, the projection 6b moves in the elongated hole 9a of the eject arm 9, and the eject arm 9 rotates in the counterclockwise direction. At this time, the slot-in spring 10 moves toward the root portion of the eject arm 9, and biases the eject arm 9 in the counterclockwise direction and inhales the pack stopper 6 and the cassette pack c. When the stopper 6a of the pack stopper 6 abuts the abutting face 3c of the guide arm 3, the cassette pack c and the eject arm 9 are positionally regulated thereby. Simultaneously, the cutout 9b of the eject arm 9 moves forwardly during the counterclockwise rotation of the eject arm 9, and the eject lever 4 whose projection 4b engages the cutout 9b moves forwardly. In response to the movement of the eject lever 4, the engage member 3b of the guide arm 3 moves down along the slope 4a of the eject lever 4, and the pivotal movement of the guide arm 3 causes the pack guide to move down so that the cassette pack c abuts the deck plate 2. Along with the movement of the eject lever 4, the urging element 4d thereof slides and lifts the switch urging element 8a of the main switch 8 to push the pushbutton 8b to activate the driving motor (not shown).

B. EJECTION

When the eject lever 4 is progressively urged, the urging element 4d thereof is released from the switch urging element 8a of the main switch 8. As a result, the switch urging element 8a moves forwardly under the resilient force applied thereto, moves away after releasing its compression against the pushbutton 8b, and stops the driving motor (not shown). Concurrently, the projection 4c of the eject lever 4 moves the memory plate 11 rearwardly, and the side edge of the memory plate 11 abuts the projection 13a of the lock plate 13 to rotate it in the clockwise direction. Therefore, the engage portion 13b of the lock plate 13 unlocks the engage portion 14a of the power plate 14, and the power plate 14 retreats (to the right in FIGS. 1, 5 to 9 and 12) under the biasing energy of the power plate spring 15. At this time, the head plate 16 operatively linked to the power plate 14 by the head plate spring 17 also withdraws (to the right). On the other hand, the engage element 3b of the guide arm 3 moves up along the slope 4a of the eject lever 4, and the pack guide 5 moves up accordingly. When the eject lever 4 is further urged, the projection 4b thereof moves the cutout 9b of the eject arm 9 rearwardly, and the eject arm 9 rotates in the clockwise direction. Therefore, the pack stopper 6 in engagement with the eject arm 9 via the elongated hole 9a moves forwardly along the slot 3a of the guide arm 3. The slot-in spring 10 moved to the back of the guide arm 3 by the rotation of the eject arm 9 gives the eject arm 9 a clockwise rotating force to eject the cassette pack c.

C. END DETECTION MODE

In this embodiment, the above-described end detection mechanism performs tape end detection.

FIG. 3 shows the configuration in the forward play mode. The sensor arm 2 receives a counterclockwise rotating force due to a friction thereof with the check plate 21 mounted to the reel base 24. Since the power arm 19 is connected to the elongated hole 20a to the sensor arm 20 by the projection 19d, it receives the counterclockwise rotating force. Therefore, the projection 19c of the power arm 19 moves along the inner cam 27 of the idler gear 22 in the play mode.

Figure 4:
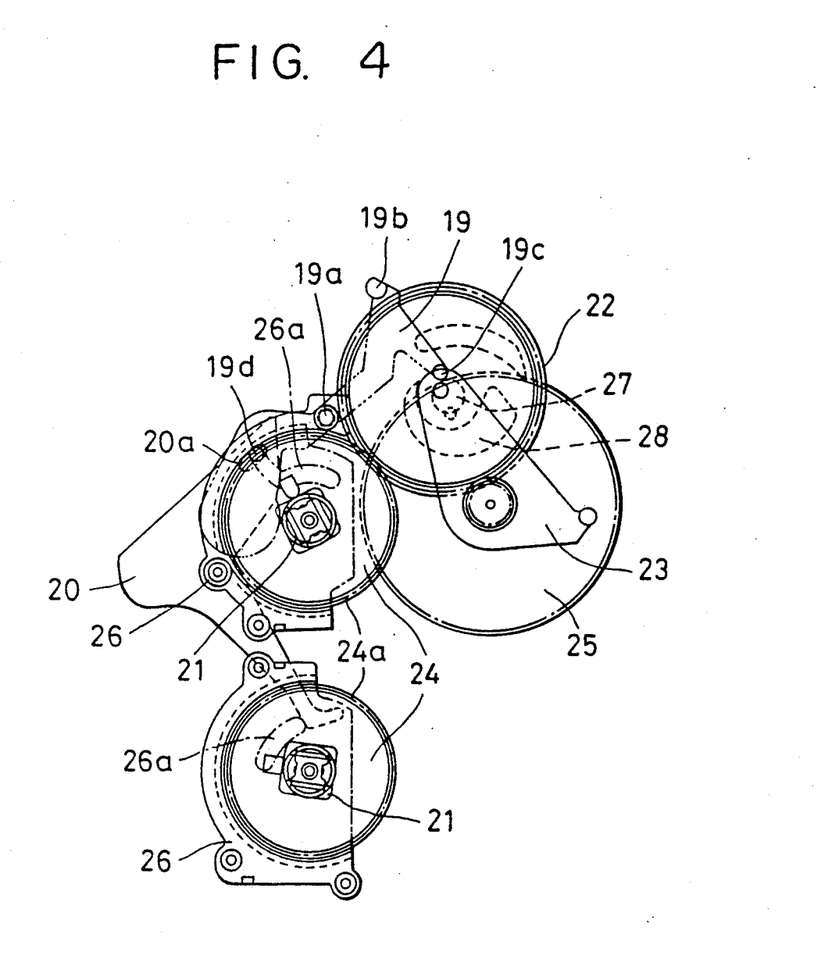

However, the rotating force from the check plate 21 to the sensor arm 20 is lost at a tape end and during withdrawal of the head plate. In this connection, as shown in FIG. 4, the projection 19c of the power arm 19 moves to the outer cam 28 via the maximum point of the inner cam 27. The power arm 19 rotates largely in the counterclockwise direction, and the projection 19b of the power arm 19 moves to the left in FIGS. 3 and 4.

In the reverse play mode, the check plate 21 urges the sensor arm 20, and the same process as the play mode follows it.

D. HEAD SHIFT MODE

FIG. 5 shows the configuration during withdrawal of the head plate. When the driving motor (not shown) is started by the above-explained slot-in operation, the rotating force of the driving motor (not shown) is transmitted to the reel base 24 via the flywheel 25 and the idler gear 22. The reel base 24 rotates responsively, and the above-mentioned function of the end detecting section causes the projection 19c of the power arm 19 to move along the outer cam 28 of the idler gear 22 to rotate the power arm 19 in the counterclockwise direction. The projection 19b of the power arm 19 brings the select plate 18 forwardly. At this time, the projection 18b of the select plate abuts the guide portion 14b of the power plate 14, and the swing member 18a, while swinging forwardly, causes the power plate 14 to advance (to the left). The engage member 14a of the power plate 14 is then locked by the engage portion 13b of the lock arm 13.

Figure 6:
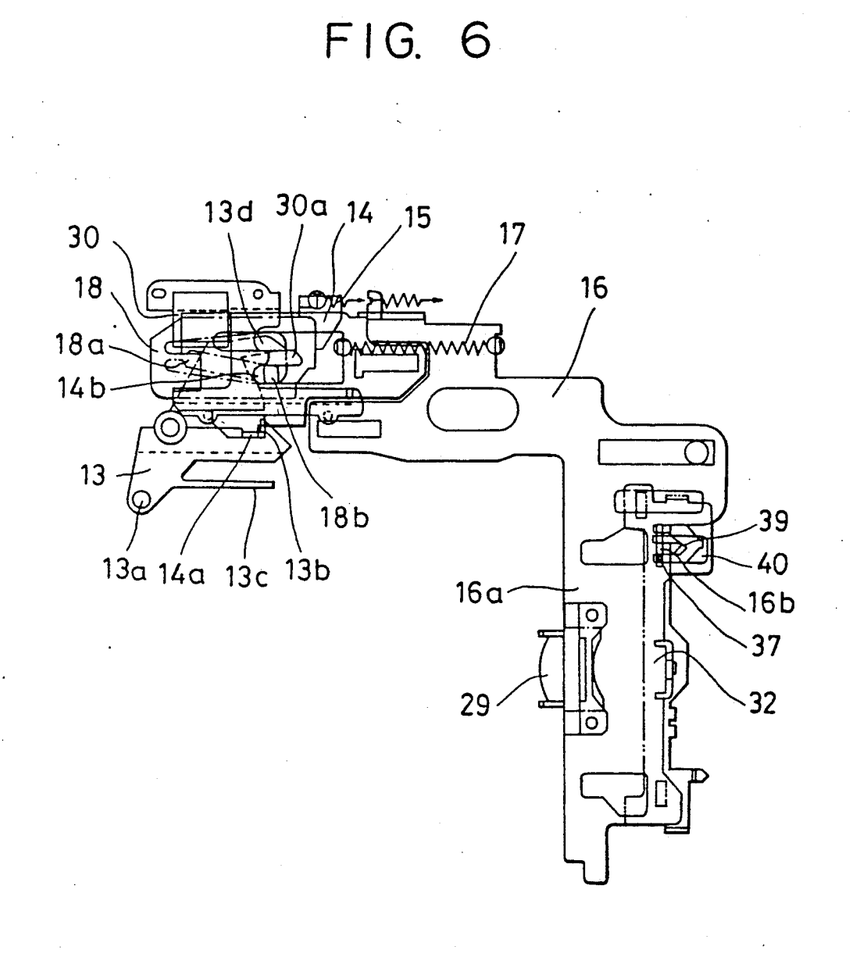

In this case, since the power plate 14 is pulled to the head plate 16 by the head plate spring 17, the head plate 16 advances (to the left) together with the power plate 14, and the head 29 closely contacts the running tape (FIG. 6).

At this time, the head plate 16 is fixed in a predetermined position, and has a smaller stroke than that of the power plate 14 which stops halfway. Therefore, the pivotal stroke of the power arm 19 may be roughly set as having an overstroke, with respect to the moving stroke of the head plate 16 which is moved frequently.

After this, when the outer cam 28 of the idler gear 22 completes one revolution, the select plate 18 is returned to its original position by the select plate spring 31, and the play mode is established.

In this embodiment, the head plate 16 withdraws (to the right) in different processes between an end detection and a manual change.

(1) END DETECTION (AUTO REVERSE)

Figure 7:
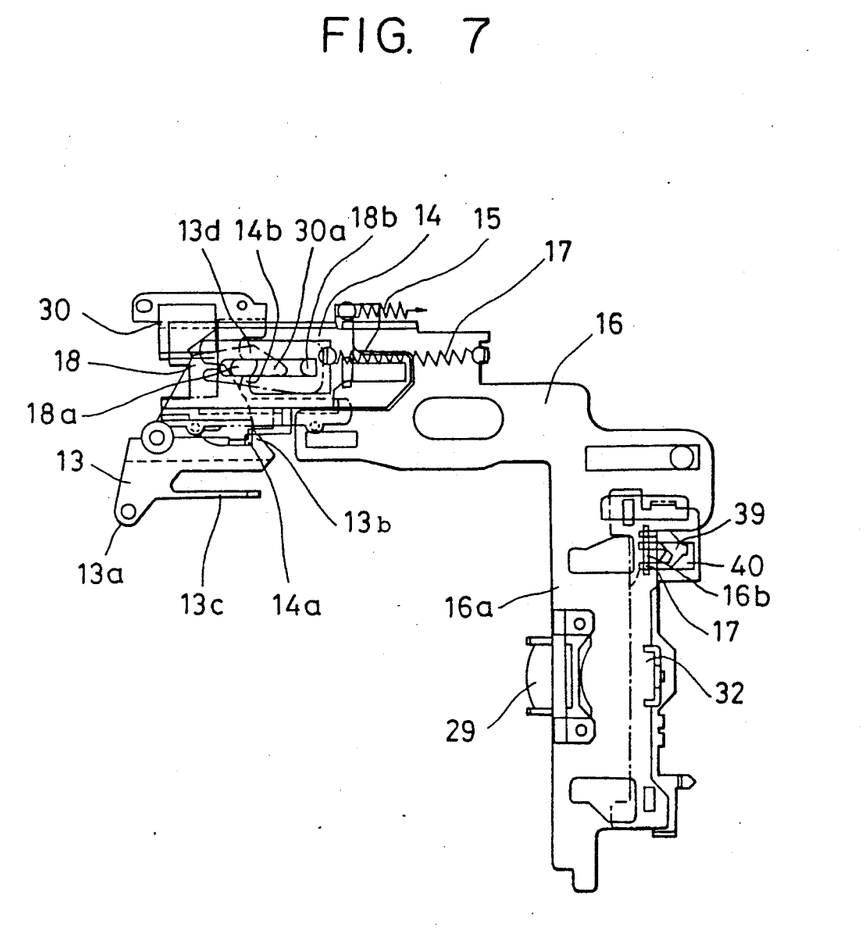
Figure 8:
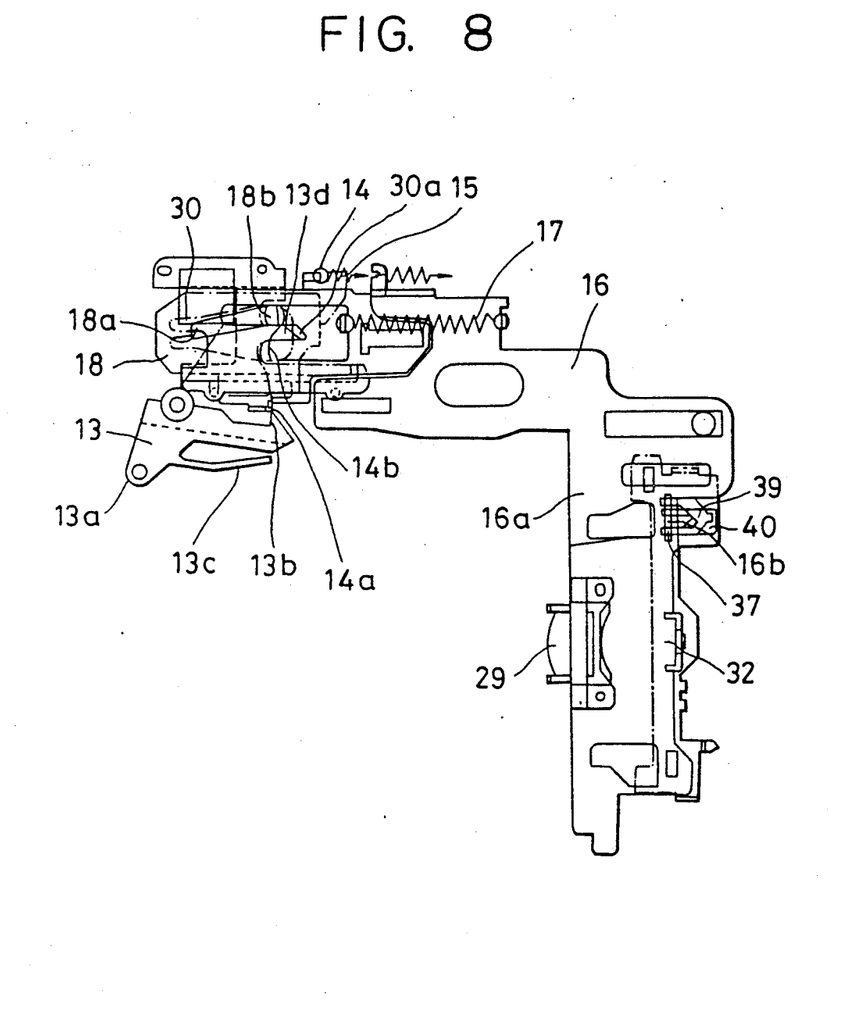

When the tape reaches an end in the advance state of the head plate 16 shown in FIG. 7, the end detection mechanism causes the power arm 19 to rotate in the counterclockwise direction, and the projection 19b of the power arm 19 moves the select plate 18 outwardly (leftwardly in FIG. 5). At this time, since the power plate 14 is also located in its advance position (leftward position) together with the head plate 16, the projection 18b of the select plate 18 does not abut the guide portion 14b of the power plate 14 but moves rearwardly along the guide claw 30a of the power holder 30. The projection 18b abuts the claw 13d of the lock arm 13 and rotates the lock arm 13 in the clockwise direction. Therefore, the engage portion 13b of the lock arm 13 unlocks the engage portion 14a of the power plate 14 (FIG. 8).

(2) MANUAL CHANGE

When the eject lever 4 is pushed by 3mm approximately from the advance state of the head plate 16 shown in FIG. 7, the memory plate 11 moves rearwardly, with its urging portion 11a compressing the projection 13a of the lock arm 13 to rotate the lock arm 13 in the clockwise direction, and with its engage portion 13b unlocking the engage portion 14e of the power plate 14 (FIG. 9).

E. CHANNEL CHANGE MODE

In this embodiment, withdrawal (rightward movement in FIGS. 1, 5 to 9 and 12) of the head plate 16 activates the channel change section to effect a channel change as explained below.

(1) MOVEMENT OF CHANGE PLATE

As shown in FIG. 11B, the advance (leftward) movement of the head plate 16 causes the pin 37 to move in the elongated hole 16b rearwardly (upwardly in the drawing) and about the projection 40c of the deck guide 40. At this time, since the pin 37 is located rearwardly of the apex of the projection 40c, it abuts the upper slope edge of the projection 40c. At this time, since the upper end of the projection 40c coincides with the apex of the projection 39c of the change plate guide 39, the pin 37 moves to the upper slope edge of the projection 39c of the change plate guide 39, and pushes the change plate 32 downwardly in the drawing as shown in FIG. 11C. Subsequently, at the time shown in FIG. 11D, the movement of the change plate 32 is completed, and the guide slot 39a of the change plate 39 and the guide slot 40a of the deck guide 40 coincide to permit the pin 37 to advance (to the left) in the guide slots. At the time of FIG. 11E, the head plate 16 completes its advance movement (leftward movement), and the reverse plate mode is established. When the head plate 16 withdraws (to the right) from this state, the pin 37 withdraws along the outer periphery of the change plate guide 39, and as shown in FIG. 11F; it enters in the recess 39d of the change plate guide 39. In this case, since the recess 39d is displaced downwardly in the drawing by the movement of the change plate 32, the withdrawal (rightward movement) of the head plate 16 terminates at the time when the pin 37 engaging the recess 39d is located forwardly of apex of the projection 40c. Therefore, when the head plate 16 advances (to the left) again, the pin 37 moves forwardly (downward in the drawing) in the elongated hole 16b and abuts the lower slope edge of the projection 40c. At this time, the lower end of the projection 40c coincides with the apex of the projection 39c of the change plate guide 39, and the pin 37 moves to the lower slope edge of the projection 39c of the change plate guide 39 and pushes the change plate 32 upwardly in the drawing. When the change plate 32 completes its movement, as shown in FIG. 11G, the guide slot 39b of the change plate guide 39 and the guide slot 40b of the deck guide 40 coincide, and the pin 37 advances (to the left) in the guide slots in response to the advance of the head plate 16, so as to establish the forward play mode.

(2) CLOSE CONTACT OF PINCH ROLLER AND ITS CHANGE

As shown in FIG. 10B, the pinch roller case 33 advances (to the left) in response to the head plate 16. This advance (leftward) movement also causes the change plate 32 to move as referred to above. FIG. 10B shows the configuration in the forward play mode where the change plate 32 is in a lower position. Therefore, as shown in FIG. 10A, the lower end of the pinch spring 35 provided on the back face of the pinch roller case 33 abuts the lower abutting portion 32a of the change plate 32, and the upper end of the pinch spring 35 urges the pinch roller case 33. As a result, the pinch roller case 33 rotates in the counterclockwise direction about the pivot 33a, and the forward-drive pinch roller 34 and the idler arm 23 pivot. Thereby, the pinch roller 34 closely contacts the capstan 41 and the idler gear 22 on the idler arm 23 closely contacts the reel base 24.

On the other hand, upon a channel change form the forward mode to the reverse mode, when the head plate 16, once withdrawing, advances (to the left) again, the change plate 32 moves rearwardly. Responsively, the upper end of the pinch spring 35 abuts the abutting portion 32a of the change plate 32, and the lower end of the pinch spring 35 urges the pinch roller case 33. As a result, the pinch roller case 33 rotates about the pivot 33a in the clockwise direction to cause the reverse-drive pinch roller 34 and the idler arm 23 to pivot to establish close contact between the pinch roller 34 and the capstan 41 and between the reverse-drive idler gear 22 and the reel base 24.

According to the above-described channel changing mechanism, the moving stroke of the change plate 32 may be as small as 1.8mm, approximately, in the forward and reverse modes. This reduction of the change plate stroke from conventionally required 5mm to 1.8mm, approximately, is enabled by an improved moving accuracy of the pinch roller 34 by forming the pinch roller 34 integrally with the pinch roller case 33.

F. MEMORY START

Figure 13A:
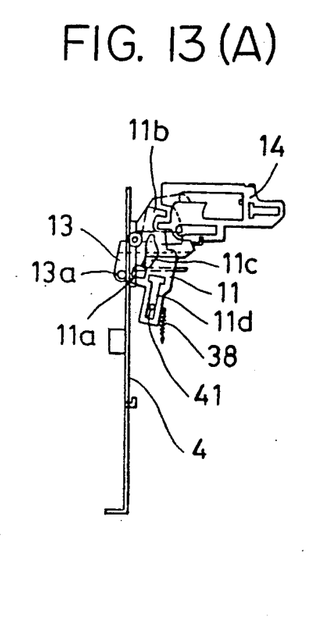
FIGS. 13A through 13E are fragmentary plan views of the same embodiment.
Figure 13B:
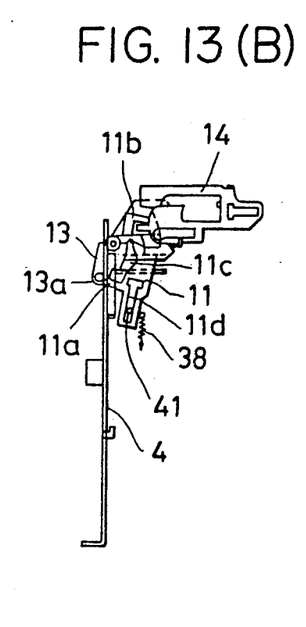
Figure 13C:
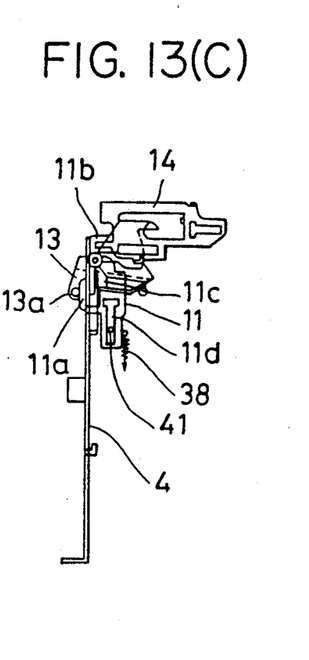
Figure 13D:
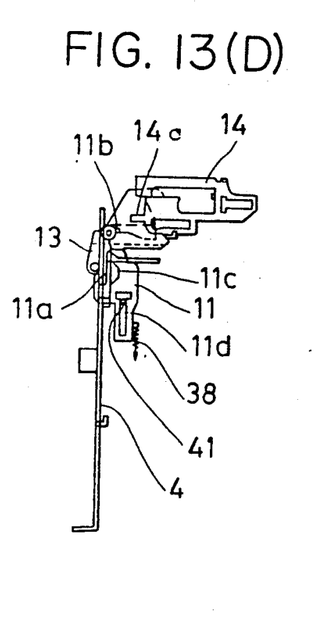

In this embodiment, the memory start mechanism memory plate 11, urged by the projection 4c of the eject lever 4, moves rearwardly, with its outer (left) edge portion of the elongated slot 11c slidably engaging the deck pin 42, and is slanted to the right by the energy of the memory plate spring 38, with its hook portion 11e engaging the deck pin 42. In this sate, when the cassette pack c is inserted, the eject lever 4 moves forwardly as shown in FIG. 13B. However, since the hook portion 11e abuts the deck pin 42, the memory plate 11 is held in the rear position. When the head plate 16 advances (to the left), the engage claw 11b of the memory plate 11 is urged by the projection 14c of the power arm 14, and the memory plate 11 rotates in the counterclockwise direction. As a result, the urging portion 11a of the memory plate 11 urges the projection 13a of the lock arm 13 outwardly (to the left) and rotates the lock arm 13 in the clockwise direction (FIG. 13C). Therefore, as shown in FIG. 13D, the head plate 16 is not locked by the engage portion 13b of the lock arm 13, the outer cam 28 rotates by one revolution, and the head plate 16 withdraws (to the right) under the energy of the head plate spring 17. At the same time, the memory plate 11, urged by the power plate 14, moves, with its hook portion 11e moving beyond the deck pin 42, and the deck pin comes to the elongated slot 11c. Then the memory plate 11 is held by the deck pin 42 to be parallel with the eject lever 4. When the power plate 14 withdraws (to the right) due to its cam engaging relationship, the engage claw 11b at the rear end of the memory plate 11 heretofore engaging the power plate 14 is unlocked from the projection 14c of the power plate 14, and the memory plate 11 moves forwardly under the energy of the memory plate spring 38.

Figure 13E:
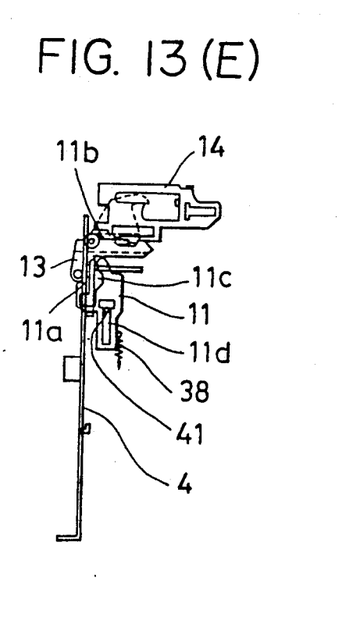

When the head plate 16 advanced (to the left) again by the power plate 14 receiving the driving force from the power arm 19 rotating along the outer cam 28, then the power plate 14 is locked by engagement between its engage portion 14a and the engage portion 13b of the lock arm 13 as shown in FIG. 13E, and the play mode is established.

The use of the memory start mechanism in this embodiment makes it possible to start the tape in the same direction upon re-starting it after ejection, by two times of rightward and leftward movements of the head plate from ejection to the play mode.

The operated member of the inventive power mechanism is not limited to the head shift mechanism in the described embodiment, and it may be a change plate, for example, other than the head plate. The select plate and the lock arm need not be resin molds, and may be in other forms which include swingingly movable members.

Accordingly to the above-described inventive power mechanism, a simple arrangement not using a solenoid plunger is established, by using a select plate including a swing portion for swinging movements between its shift and release position for shifting and releasing the operated member upon a leftward movement of the select plate effected by the rotational force of the power cam and using a guide mechanism for guiding the swing portion of the select plate to its shift and release position. Therefore, its manufacturing cost is inexpensive, and an excellent operability is realized. Further, since the select plate is selectively operative, the single power mechanism can effect both the shifting and the unlocking operations for the operated member.

What is claimed is:

1. A power mechanism comprising:
   a power plate member disposed for reciprocating motion between a shift position and a retreat position;
   a lock member for locking said power plate member in said shift position;
   biasing means for biasing said power plate member toward said retreat position;
   a motor-driven rotatable power cam;
   a select plate movable between advance and retreat positions and having a swing portion which swings between a shift position for shifting said power plate member and a release position for releasing the locking by said lock member of said power plate member when said select plate is moved toward said advance position by means responsive to a rotating force of said power cam; and
   a guide mechanism which guides said swing portion of said select plate toward said shift position when said power plate member is in said retreat position and toward said release position when said power plate member is in said shift position.

* * * * *